(12) United States Patent
Yeum

(10) Patent No.: US 9,518,820 B2
(45) Date of Patent: Dec. 13, 2016

(54) INTEGRATED JIG FOR ASSEMBLING INSPECTION OF DOOR ASSEMBLY AND METHOD FOR OPERATING THE SAME

(71) Applicant: HYUNDAI MOTOR COMPANY, Seoul (KR)

(72) Inventor: Jung Whan Yeum, Chungcheongbuk-do (KR)

(73) Assignee: Hyundai Motor Company, Seoul (KR)

( * ) Notice: Subject to any disclaimer, the term of this patent is extended or adjusted under 35 U.S.C. 154(b) by 146 days.

(21) Appl. No.: 14/615,270

(22) Filed: Feb. 5, 2015

(65) Prior Publication Data
US 2016/0109229 A1 Apr. 21, 2016

(30) Foreign Application Priority Data
Oct. 20, 2014 (KR) .................. 10-2014-0142092

(51) Int. Cl.
*G01B 11/27* (2006.01)

(52) U.S. Cl.
CPC .................. *G01B 11/27* (2013.01)

(58) Field of Classification Search
CPC ......................................... G01B 11/27
USPC .......................... 33/194, 549, 551
See application file for complete search history.

(56) References Cited

U.S. PATENT DOCUMENTS

| | | | | | |
|---|---|---|---|---|---|
| 4,015,338 A | * | 4/1977 | Kunze | .................. | G01B 11/27 33/193 |
| 5,636,445 A | * | 6/1997 | Johansson | ............ | G01B 5/0025 33/288 |
| 5,657,550 A | * | 8/1997 | Struble | ................... | G01B 5/14 33/544.4 |
| 6,460,264 B1 | * | 10/2002 | Bos | ...................... | G01B 5/0004 33/549 |
| 8,973,278 B2 | * | 3/2015 | Ham | ...................... | G01B 5/24 33/286 |
| 2006/0015211 A1 | | 1/2006 | Kolb et al. | | |
| 2006/0107507 A1 | | 5/2006 | Brose et al. | | |
| 2006/0107508 A1 | | 5/2006 | Bonse et al. | | |
| 2006/0137164 A1 | | 6/2006 | Kraus | | |
| 2007/0017081 A1 | | 1/2007 | Becker et al. | | |
| 2012/0145849 A1 | | 6/2012 | Yeum | | |
| 2013/0113149 A1 | * | 5/2013 | Yeum | ................. | B23K 37/0443 269/59 |
| 2014/0139659 A1 | * | 5/2014 | Lim | ................... | G01N 21/9515 348/92 |
| 2015/0144601 A1 | * | 5/2015 | Yeum | ................. | B23K 37/0443 219/86.24 |
| 2016/0084628 A1 | * | 3/2016 | Bjorni | .................... | B66B 19/00 33/559 |

FOREIGN PATENT DOCUMENTS

JP 2005-537989 A 12/2005
KR 10-2002-0058777 A 7/2002
(Continued)

*Primary Examiner* — G. Bradley Bennett
(74) *Attorney, Agent, or Firm* — McDermott Will & Emery LLP

(57) ABSTRACT

An integrated jig for assembling inspection of a door assembly includes a loading module on which a door assembly is held. An alignment module aligns a position of the door assembly to be a reference position and fixes the door assembly to the loading module. A sensor module inspects an assembling state of the door assembly.

27 Claims, 22 Drawing Sheets

(56) References Cited

FOREIGN PATENT DOCUMENTS

| KR | 10-2003-0013714 A | 2/2003 |
|---|---|---|
| KR | 10-0850976 B1 | 8/2008 |
| KR | 10-0996590 B1 | 11/2010 |
| KR | 10-1220380 B1 | 1/2013 |
| KR | 10-2014-0065580 A | 5/2014 |

\* cited by examiner

INTEGRATED JIG FOR ASSEMBLING INSPECTION OF DOOR ASSEMBLY AND METHOD FOR OPERATING THE SAME

CROSS-REFERENCE TO RELATED APPLICATION

This application is based on and claims the benefit of priority to Korean Patent Application No. 10-2014-0142092, filed on Oct. 20, 2014 in the Korean Intellectual Property Office, the disclosure of which is incorporated herein in its entirety by reference.

TECHNICAL FIELD

The present disclosure relates to an integrated jig for assembling inspection of a door assembly and a method for operating the same, and more particularly, to an integrated jig for assembling inspection of a door assembly and a method for operating the same capable of minimizing a measurement error at the time of inspecting an assembling error of the door assembly.

BACKGROUND

Generally, there are about 20,000 to 30,000 parts assembled in a vehicle. In particular, a plurality of panels for a door assembly are manufactured in a press process and then assembled with the door assembly by welding. Further, assembly quality of the door assembly is inspected to check quality of the door assembly which is assembled by the welding.

However, there is a need to move the door assembly from a moving jig to a test jig to inspect the assembled door assembly. In this case, the door assembly is not positioned in place causing a measurement error at the time of inspecting the assembling error, and instruments are thermally expanded or contracted depending on a temperature change causing the measurement error.

SUMMARY

The present disclosure has been made to solve the above-mentioned problems occurring in the prior art while advantages achieved by the prior art are maintained intact.

An aspect of the present disclosure is to provide an integrated jig for assembling inspection of a door assembly and a method for operating the same capable of minimizing a measurement error at the time of inspecting an assembling error of the door assembly.

According to an exemplary embodiment of the present inventive concept, an integrated jig for assembling inspection of a door assembly includes a loading module on which a door assembly is held. An alignment module aligns a position of the door assembly to be a reference position and fixes the door assembly to the loading module. A sensor module inspects an assembling state of the door assembly.

According to another exemplary embodiment of the present inventive concept, a method for operating an integrated jig for assembling inspection of a door assembly includes holding a door assembly on a loading module. The door assembly is fixed on the loading module by an alignment module. assembling state of the door assembly is inspected by a sensor module positioned at the upper portion of the loading module.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present inventive concept will be described in detail with reference to the accompanying drawings.

Figure 1:
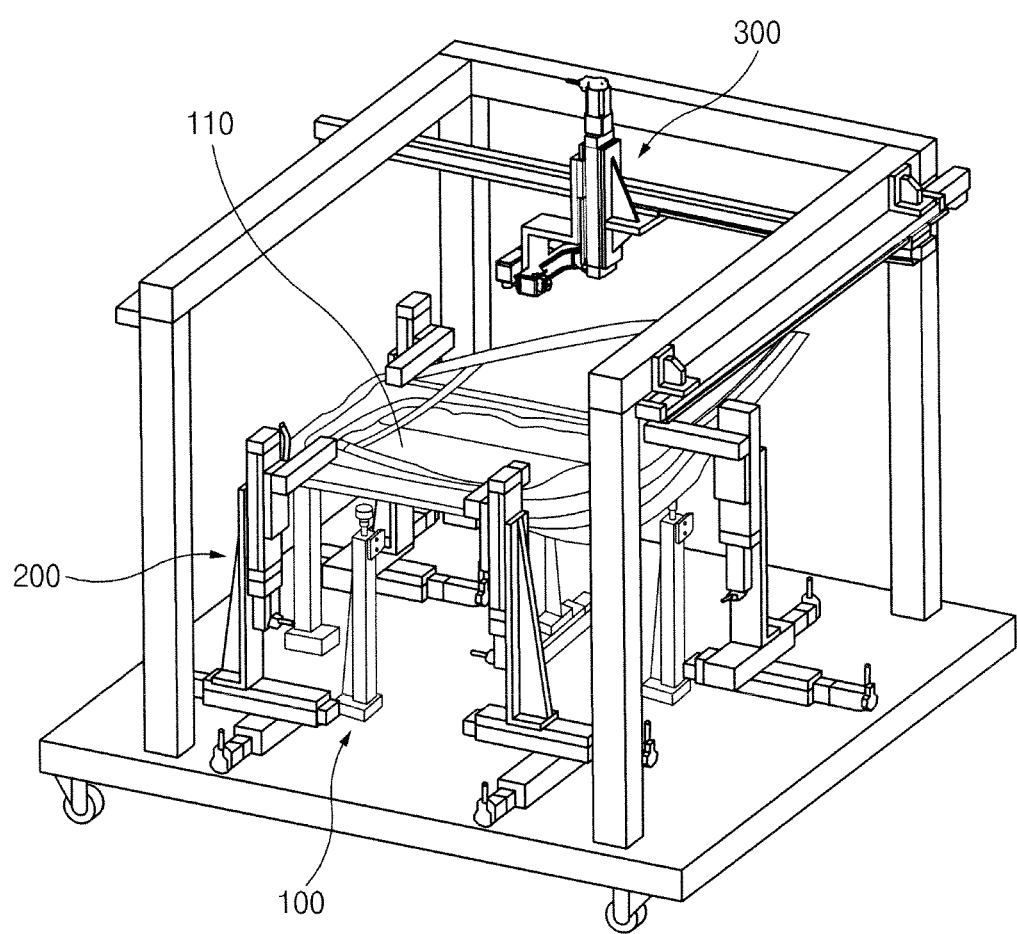
FIG. 1 is a perspective view of an integrated jig for assembling inspection of a door assembly according to an exemplary embodiment of the present inventive concept.

As illustrated in FIG. 1, an integrated jig for assembling inspection of a door assembly according to an exemplary embodiment of the present inventive concept includes a loading module 100 on which a door assembly 110 is held. An alignment module 200 aligns a position of the door assembly 110 to be a predefined reference position and fixes the door assembly 110 to the loading module 100. A sensor module 300 is configured to inspect an assembling state of the door assembly 110.

Figure 2A:
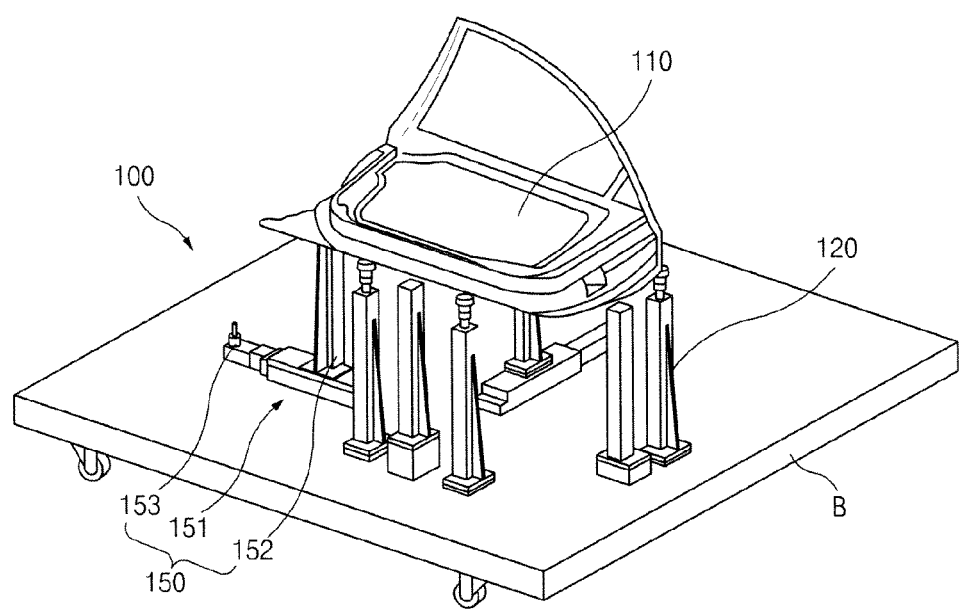
FIGS. 2A-2C are perspective views of a loading module provided in the integrated jig for assembling inspection of FIG. 1.
Figure 2B:
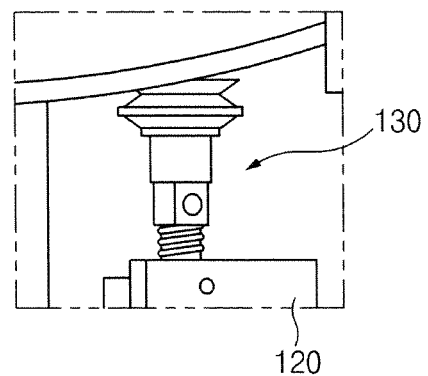
Figure 2C:
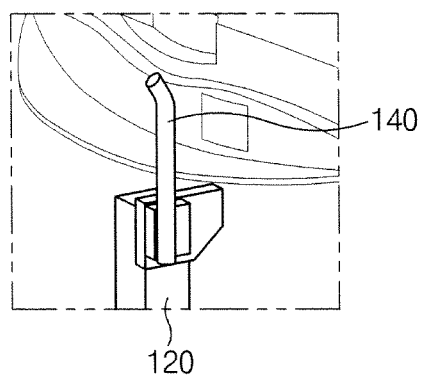

As illustrated in FIGS. 2A-2C, the loading module 100 includes a plurality of loading beams 120 disposed on a ground B. A vacuum cup 130 is disposed at an upper end of at least any one of the loading beams 120 and adsorbs onto the door assembly 110. A guide bar 140 is disposed at the upper end of at least any one of the loading beams 120, contacts a side of the door assembly 110, and prevents the door assembly 110 from moving in a width direction or a length direction of the door assembly 110.

The loading beam 120 further includes a moving apparatus 150 moving the loading beam 120 on the ground B. The moving apparatus 150 includes a body part 151 attached to the ground B, a moving part 152 embedded in the body part 151 and connected to a lower end of the loading beam 120, and an actuator 153 moving the moving part 152. The moving apparatus 150 primarily aligns the door assembly 110 which is held on the loading module 100.

Figure 12A:
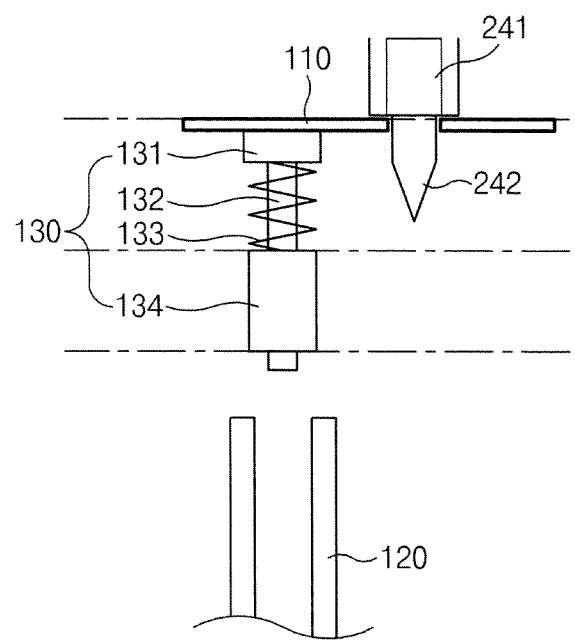
FIGS. 12A and 12B are exemplified views of the state in which the control pin is fastened into the hole according to the method for operating the integrated jig for assembling inspection of FIG. 7.
Figure 12B:
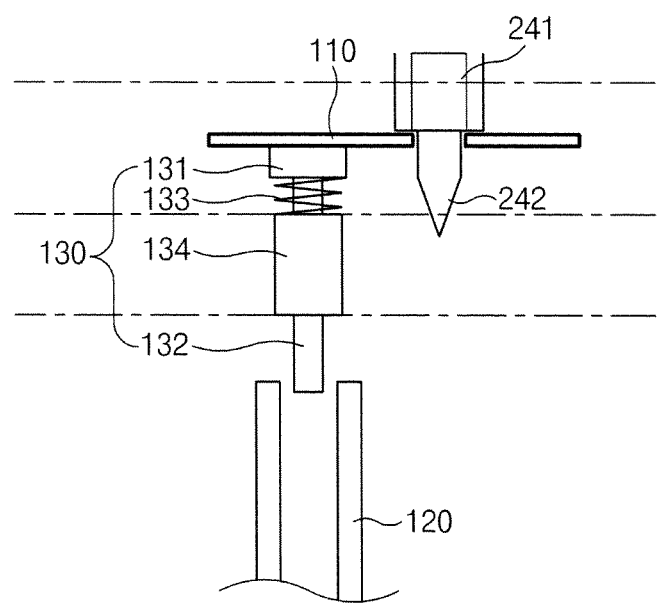
Figure 13:
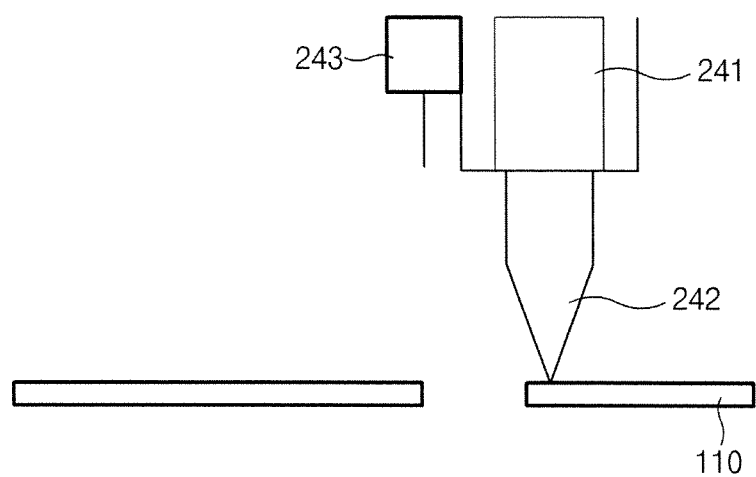
FIG. 13 is an exemplified view of a state in which matching between the control pin and the hole is improper according to the method for operating the integrated jig for assembling inspection of FIG. 7.

The vacuum cup 130, referring to FIG. 12, includes a vacuum cup pad 131 contacting the door assembly 110 to form a vacuum space. A linear rod 132 is inserted into the loading beam 120 and has the vacuum cup pad 131 fixed thereto. A vacuum cup spring 133 is wound around the linear rod 132 and located below the vacuum cup pad 131. A linear brake 134 is applied with an elastic force from the vacuum cup spring 133 and mounted in the loading beam 120 to fix the linear rod 132. After a position of the linear rod 132 changes by a control pin 240 provided in the alignment module 200 as described below, the linear brake 134 is operated to fix the position of the linear rod 132, thereby preventing the position of the door assembly 110 from changing due to an external force.

Figure 3A:
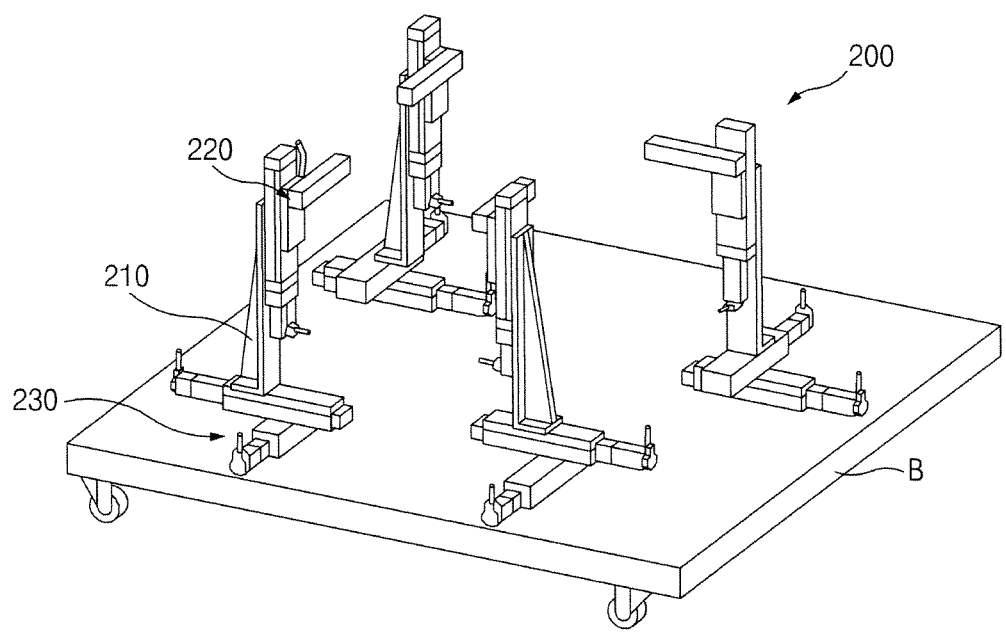
FIGS. 3A-3C are perspective views of an alignment module provided in the integrated jig for assembling inspection of FIG. 1.
Figure 3B:
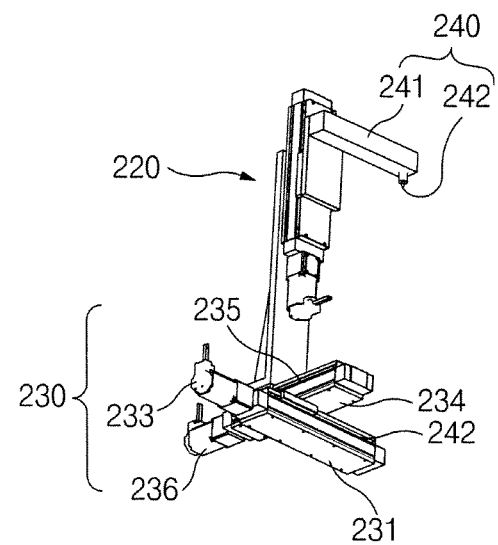
Figure 3C:
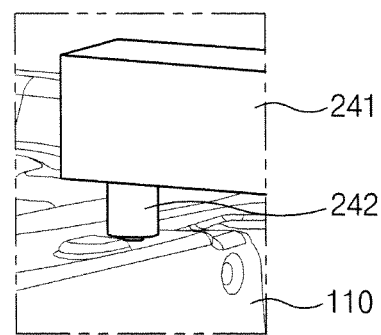
Figure 4A:
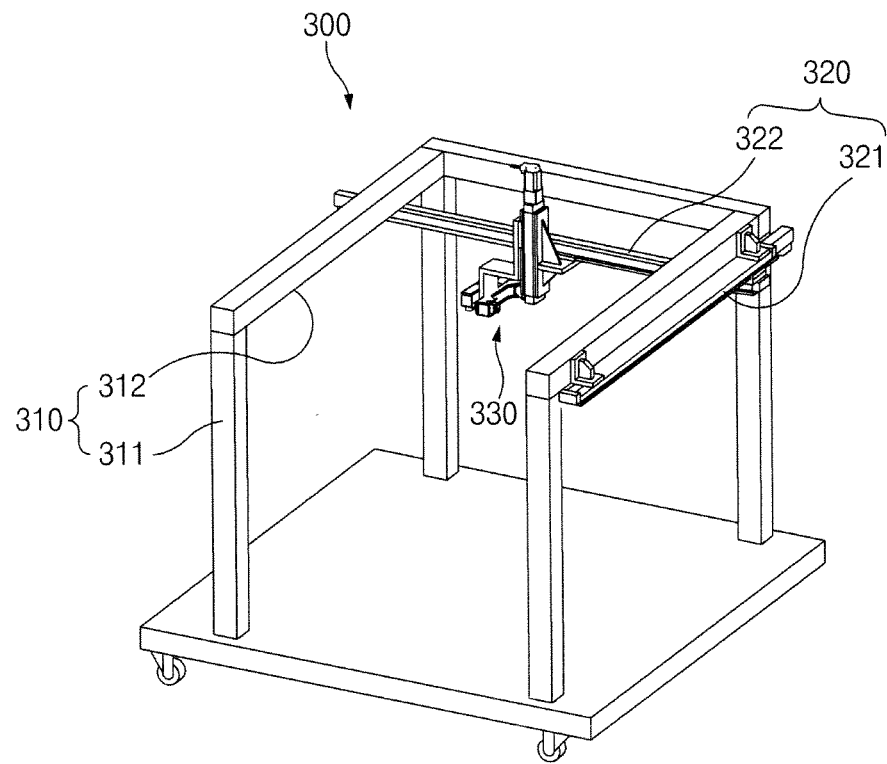
FIGS. 4A-4D are perspective views of a sensor module provided in the integrated jig for assembling inspection of FIG. 1.
Figure 4B:
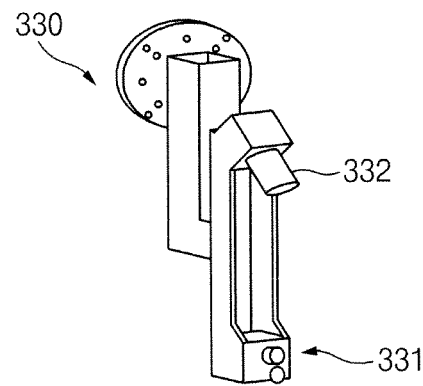
Figure 4C:
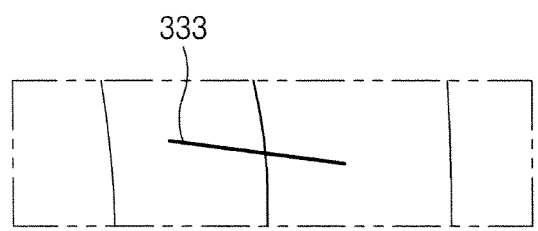
Figure 4D:
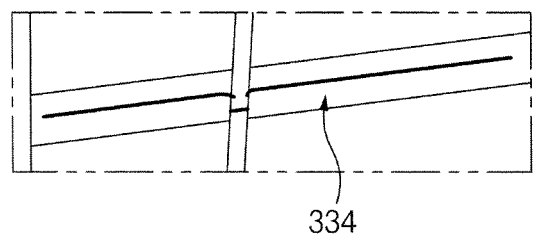

As illustrated in FIGS. 3A-3C, the alignment module 200 includes a plurality of alignment beams 210 disposed on the ground B, and a vertical moving apparatus 220 provided at the alignment beam 210 to move along a length direction of the alignment beam 210. A horizontal moving apparatus 230 is interposed between the alignment beam 210 and the ground B and moves the alignment beam 210 in a horizontal direction. A control pin 240 is mounted to the vertical moving apparatus 220. The vertical moving apparatus 220 includes a load cell measuring a force generated while the vertical moving apparatus 220 moves.

The horizontal moving apparatus 230 includes a first body part 231 fixed on the ground B, a first moving part 232 embedded in the first body part 231 and moving along a length direction of the first body part 231, and a first actuator 233 moving the first moving part 232. The horizontal moving apparatus 230 includes further a second body part 234 positioned at an upper end of the first body part 231 to allow a central axis in a length direction of the second body part 234 be vertical to a central axis in the length direction of the first body part 231 and restrictively connected to the first moving part 232. A second moving part 235 is embedded in the second body part 234 and moves along the length direction of the second body part 234, and a second actuator 236 moves the second moving part 235.

The control pin 240 includes a horizontal bar 241 protruding in a width direction of the alignment beam 210 from the vertical moving apparatus 220. A pin 242 is provided on a bottom surface of the horizontal bar 241 and vertically protrudes toward the ground B. A laser displacement sensor 243, which is provided at the horizontal bar 241, is horizontal to the pin 242. The control pin 240 is fastened into a hole provided in the door assembly 110 to secondarily align the door assembly 110.

As illustrated in FIGS. 4A-4D, the sensor module 300 includes a frame 310 inside which the loading module 100 and the alignment module 200 are disposed. A plurality of rails 320 are provided in the frame 310, and a sensor body 330 is vertically and horizontally movable along the rails 320. The frame 310 comprises a plurality of pillars 311 disposed on the ground B on which the loading module 100 and the alignment module 200 are positioned. A plurality of horizontal beams 312 connect at least two of the pillars 311 to each other. The rail 320 includes a plurality of horizontal rails 321 each of which are provided at the horizontal beam 312 configuring the frame 310. A moving rail 322 is connected to different horizontal rails 321 and both ends of the moving rail 322 move along the horizontal rails 321.

The sensor body 330 includes a laser generating optical device 331 generating a line laser toward a coupling portion of the door assembly 110 and a camera 332 photographing an image 333 of the line laser focused on the coupling portion to obtain a photographed image 334 of the line laser. The sensor module 300 further includes a calibration block 340 (see FIGS. 6A-6C) provided at one side of the loading module 100 and the alignment module 200.

Figure 6A:
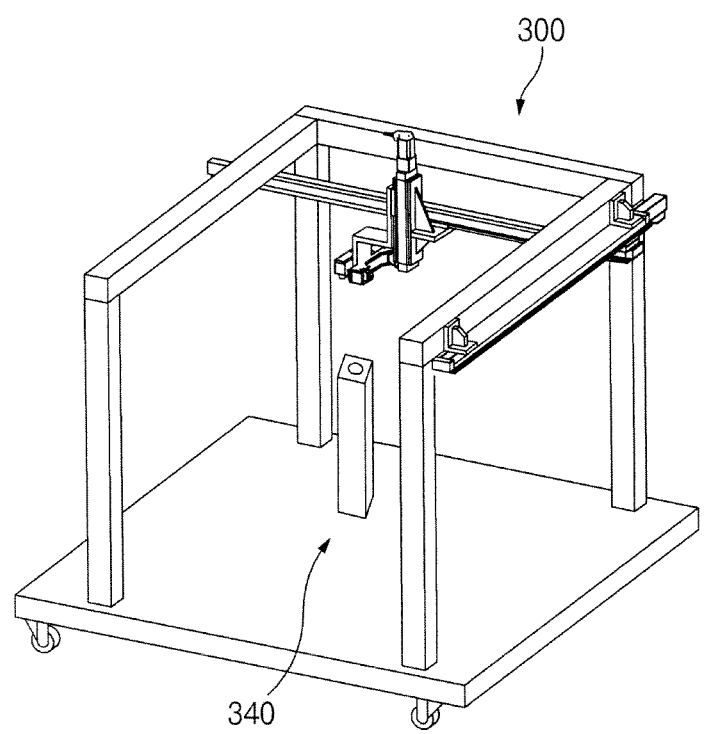
FIGS. 6A-6C are a perspective view, a front view, and a plan view of a calibration block provided in the integrated jig for assembling inspection of FIG. 1.
Figure 6B:
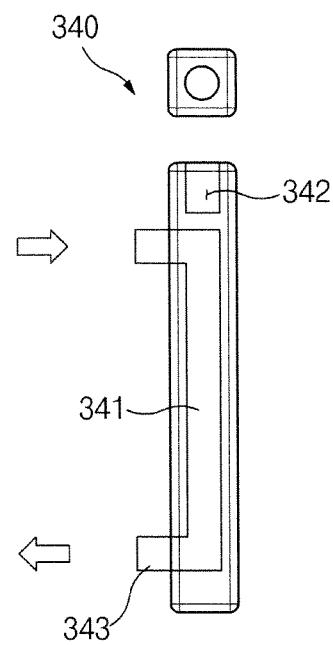
Figure 6C:
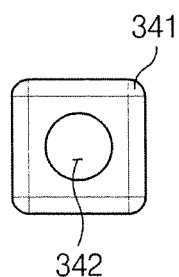

As illustrated in FIGS. 6A-6C, the calibration block 340 includes a block pillar 341 disposed on the ground B, and a reference hole 342 vertically formed at an upper end of the block pillar 341. A cooling water flowing channel 343 is formed inside the block pillar 341 to maintain the block pillar 341 at a reference temperature.

Figure 5A:
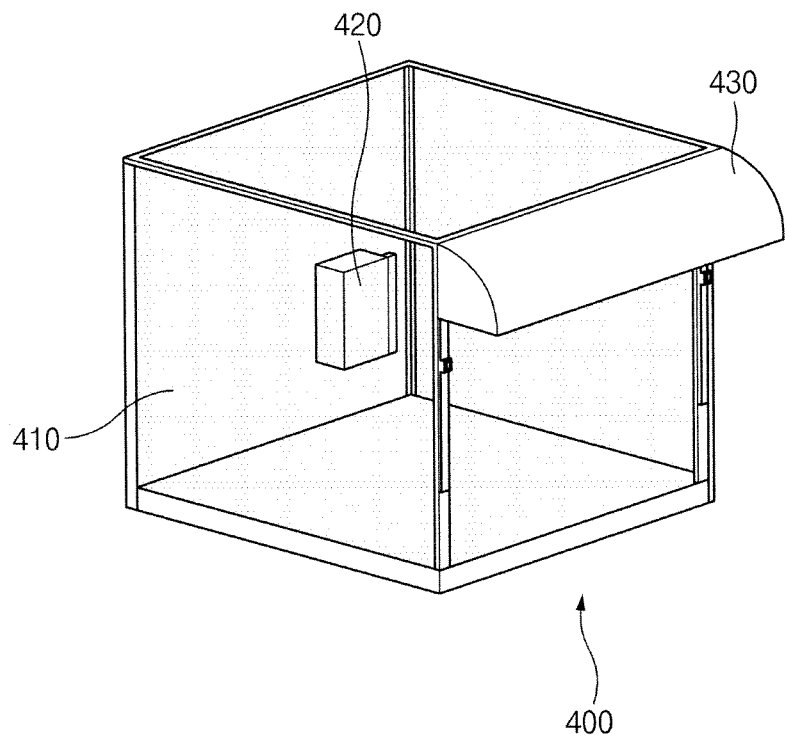
FIGS. 5A and 5B are perspective views of a cooling module provided in the integrated jig for assembling inspection of FIG. 1.
Figure 5B:
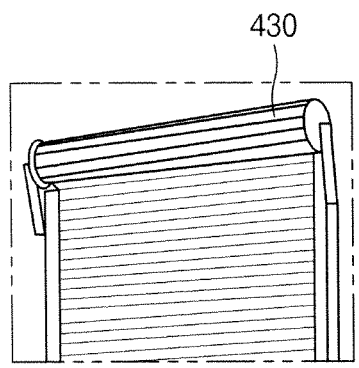

Referring to FIGS. 5A and 5B, the integrated jig for assembling inspection according to the exemplary embodiment of the present inventive concept further includes a cooling module 400 for cooling the loading module 100, the alignment module 200, and the sensor module 300. The cooling module 400 includes a space forming container 410 in which the loading module 100, the alignment module 200, and the sensor module 300 are accommodated and having a hexahedron shape with one opened surface. An air conditioner 420 is mounted inside the space forming container 410, and a door 430 selectively opens and closes the opened surface of the space forming container 410. The mounted cooling module 400 prevents heat generated from the loading module 100, the alignment module 200, the sensor module 300, and the door assembly 110 from changing due to an external temperature change, thereby reducing the measurement error.

According to the exemplary embodiment of the present inventive concept, the door 430 provided in the space forming container 410 is a rapid roll door (RRD) being closed from an upper portion of the space forming container 410 toward a lower portion thereof and being opened from the lower portion of the space forming container 410 toward the upper portion thereof.

Figure 7:
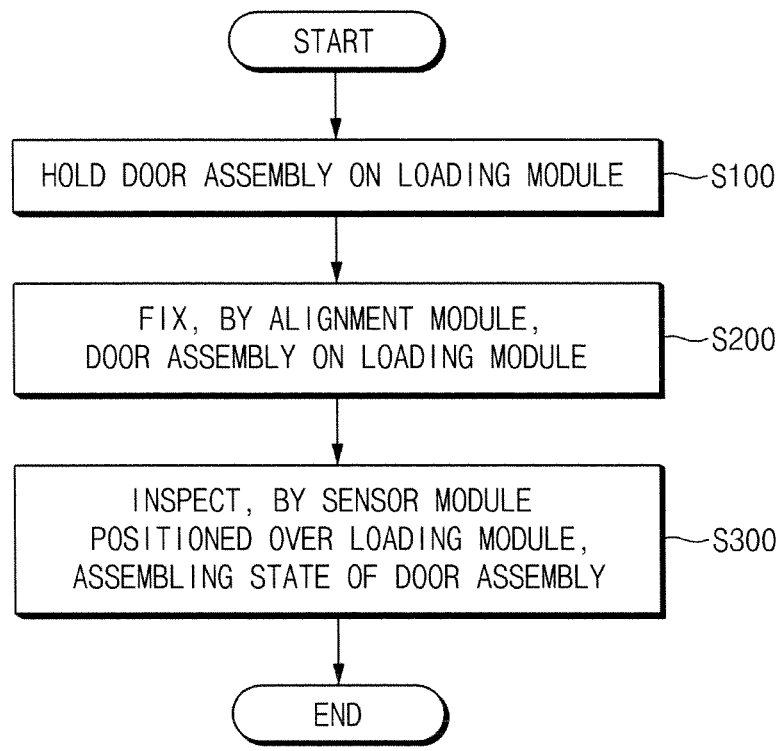
FIG. 7 is a flow chart of a method for operating an integrated jig for assembling inspection according to an exemplary embodiment of the present inventive concept.

The integrated jig for assembling inspection of the door assembly 110 according to the exemplary embodiment of the present inventive concept configured as described above is operated according to a flow chart illustrated in FIG. 7. A detailed description thereof will be provided below.

As illustrated in FIG. 7, a method for operating an integrated jig for assembling inspection of the door assembly 110 according to an exemplary embodiment of the present inventive concept includes holding the door assembly 110 on the loading module 100 (S100). The door assembly 110 on the loading module 100 is fixed by the alignment module 200 (S200). The assembling state of the door assembly 110 is inspected by the sensor module 300 positioned over the loading module 100 (S300).

Figure 8:
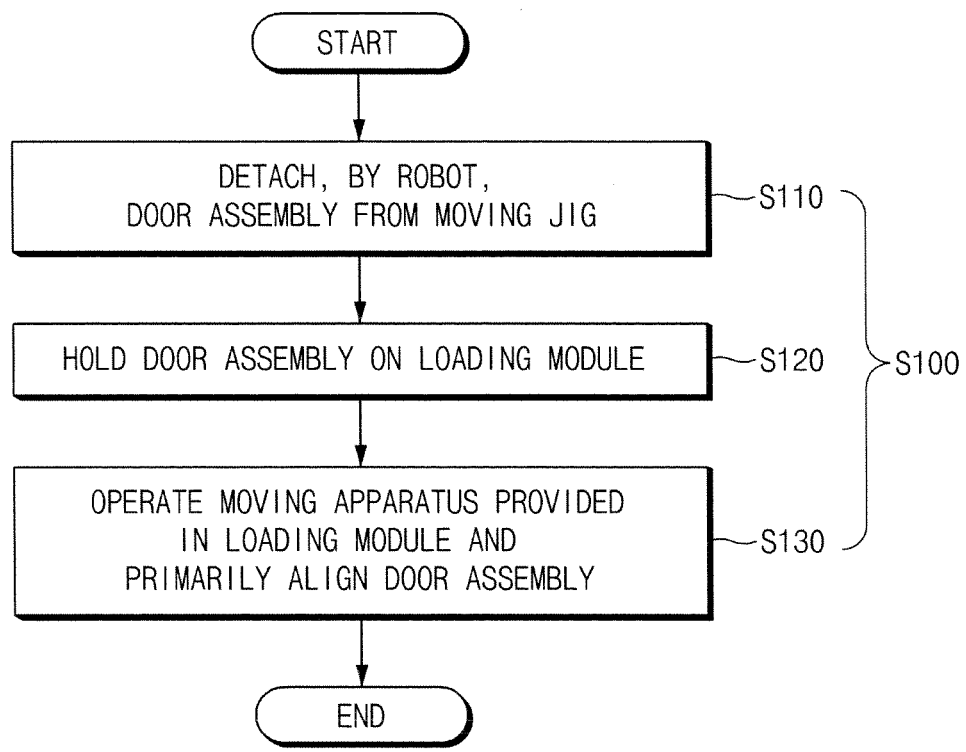
FIG. 8 is flow chart of a process of holding the door assembly on the loading module, in the method for operating the integrated jig for assembling inspection of FIG. 7.
Figure 9A:
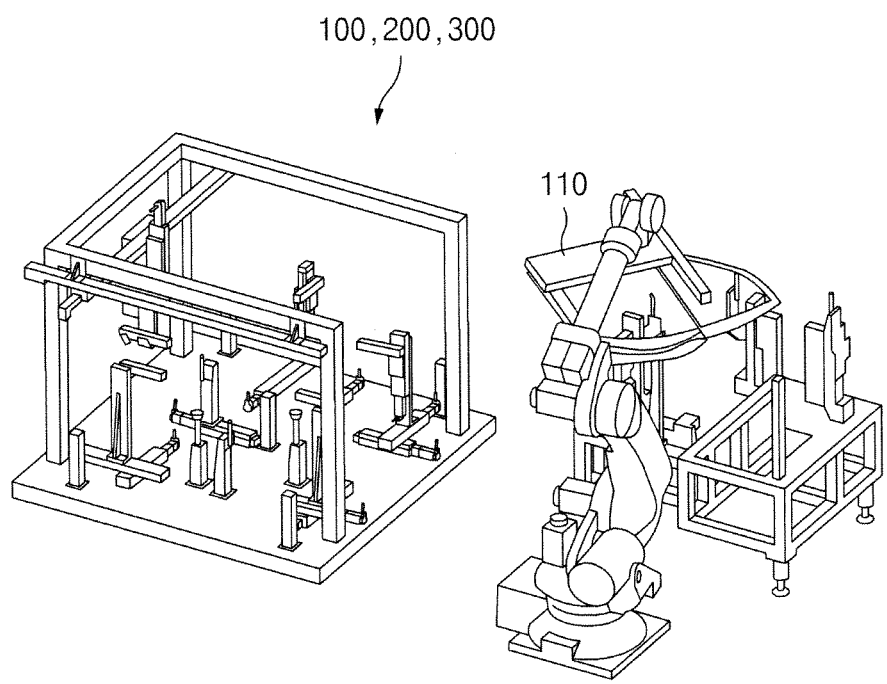
FIGS. 9A and 9B are perspective views of a state in which the door assembly is held on the loading module, according to the method for operating the integrated jig for assembling inspection of FIG. 7.
Figure 9B:
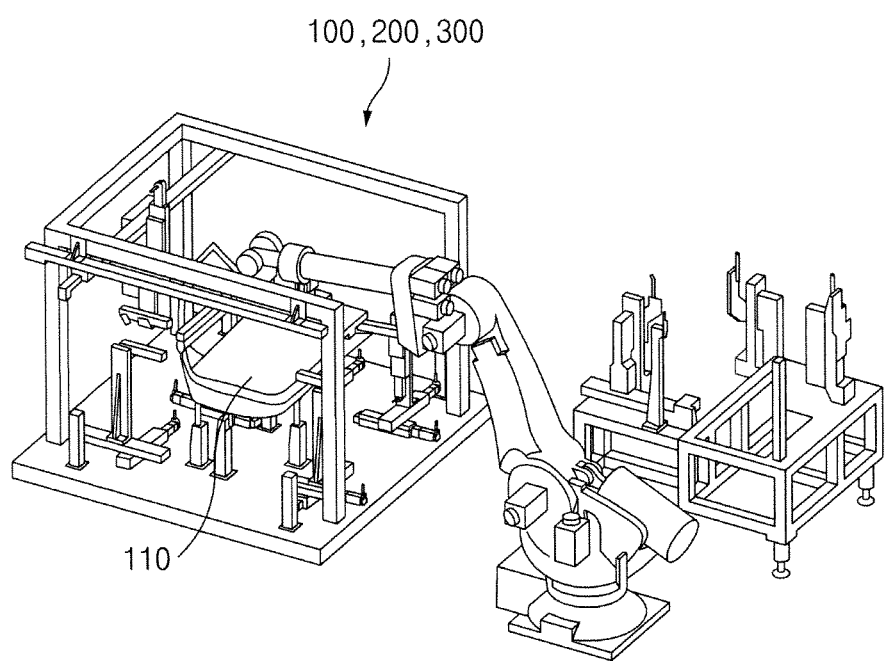
Figure 10:
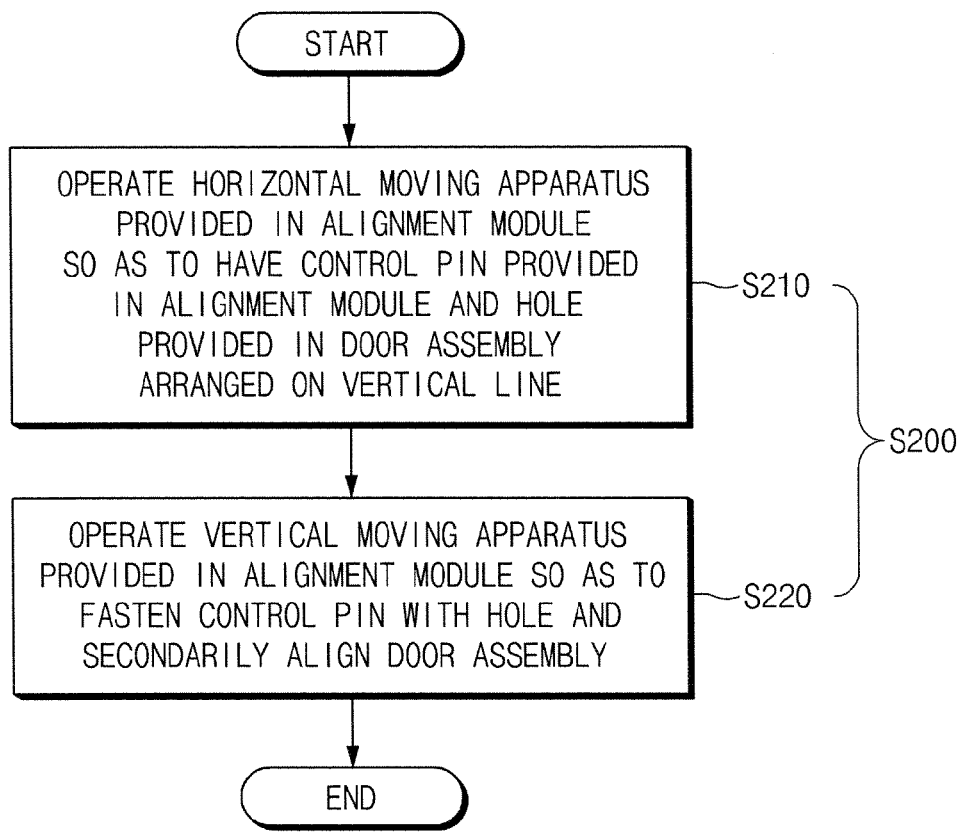
FIG. 10 is flow chart of a process of fixing the door assembly on the loading module, in the method for operating the integrated jig for assembling inspection of FIG. 7.
Figure 11:
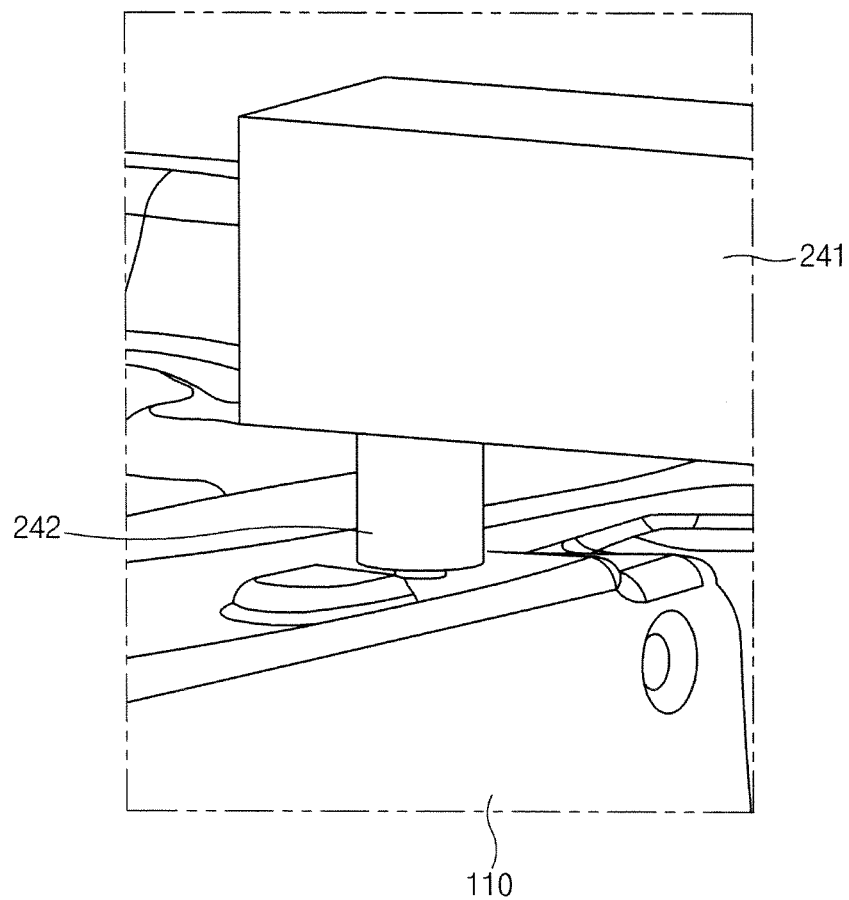
FIG. 11 is a perspective view of a state in which a control pin is fastened into a hole according to the method for operating the integrated jig for assembling inspection of a door assembly of FIG. 7.

As illustrated in FIGS. 8-9B, the step of holding the door assembly 110 (S100) includes detaching the door assembly 110 from the moving jig by a robot (S110). The door assembly 110 is held on the loading module 100 (S120). The moving apparatus 150 provided in the loading module 100 is operated and the door assembly 110 is aligned (S130).

As illustrated in FIGS. 10 to 13, the step of fixing the door assembly 110 (S200) includes operating the horizontal moving apparatus 230 provided in the alignment module 200 arranged on a vertical line to have the control pin 240 provided in the alignment module 200 and the hole provided in the door assembly 110 (S210). The vertical moving apparatus 220 provided in the alignment module 200 is operated to fasten the control pin 240 into the hole and to align the door assembly 110 (S220).

The step of operating the vertical moving apparatus 220 (S220) continues until the door assembly 110 reaches a preset height, and when the door assembly 110 reaches the preset height, a brake (not shown) provided in the loading module 100 is operated. The brake fixes a position of the linear module provided in the loading module 100 to prevent the position of the door assembly 110 from changing due to the external force.

In the step of operating the vertical moving apparatus 220 (S220), when a value measured by the laser displacement sensor 243 provided in the alignment module is different from the preset value, it is determined that the door assembly 110 is not properly aligned.

In the step of operating the vertical moving apparatus 220 (S220), when the measurement value of a load cell provided in the vertical moving apparatus 220 is increased, it is determined that the control pin 240 and the hole are not matched.

Figure 14:
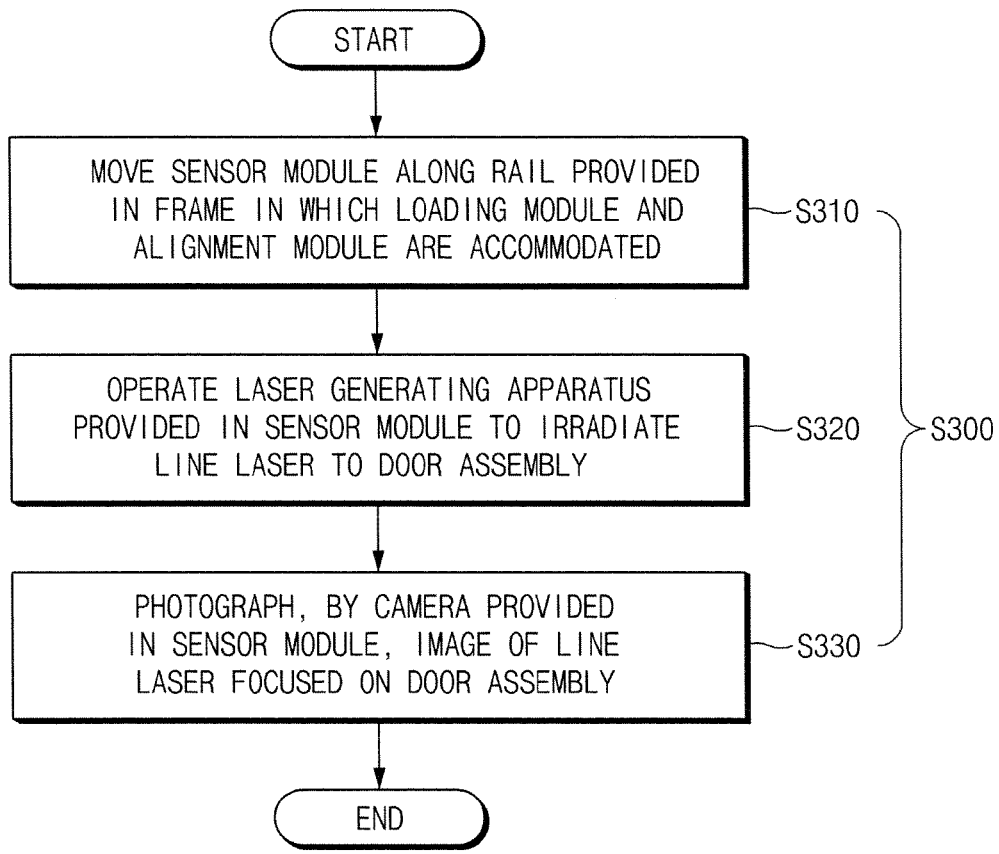
FIG. 14 is flow chart of a process of inspecting an assembling state of the door assembly by the sensor module according to the method for operating the integrated jig for assembling inspection of FIG. 7.
Figure 15:
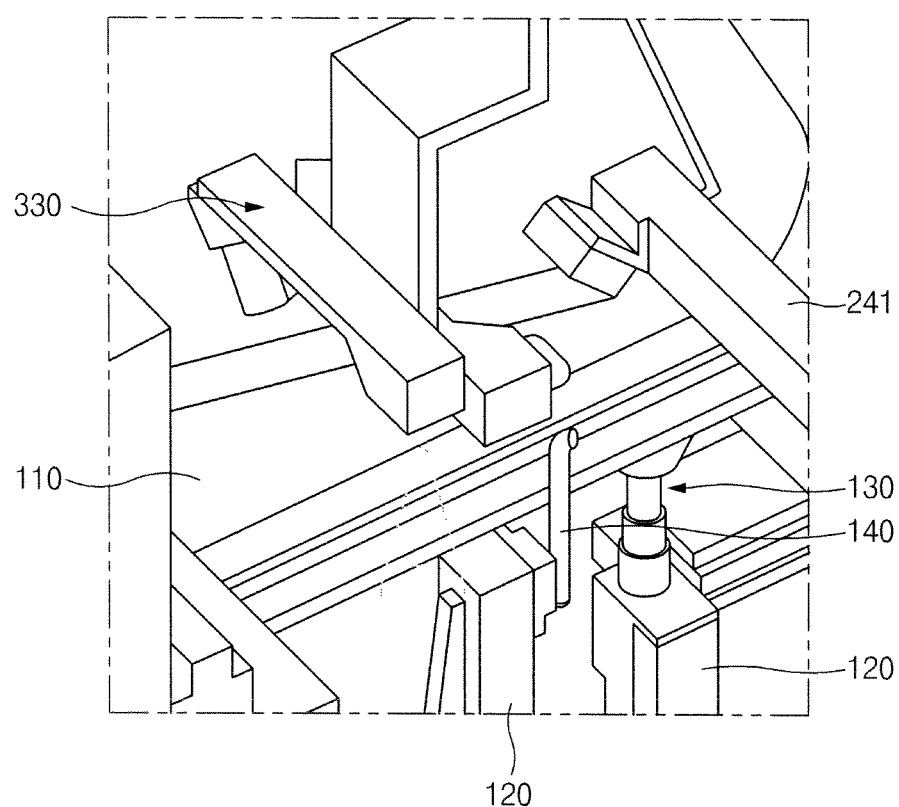
FIG. 15 is a diagram illustrating a position and a measurement state of the sensor module measuring the door assembly according to the method for operating the integrated jig for assembling inspection of FIG. 7.

As illustrated in FIGS. 14 and 15, the step of inspecting the assembling state of the door assembly 110 (S300) includes moving the sensor module 300 along the rail 320 provided in the frame 310 in which the loading module 100 and the alignment module 200 are accommodated (S310). The laser generating optical device 331 provided in the sensor module 300 is operated to generate the line laser to the door assembly 110 (S320). The image 333 of the line laser focused on the door assembly 110 is photographed by the camera 332 provided in the sensor module 300 (S330).

Figure 16:
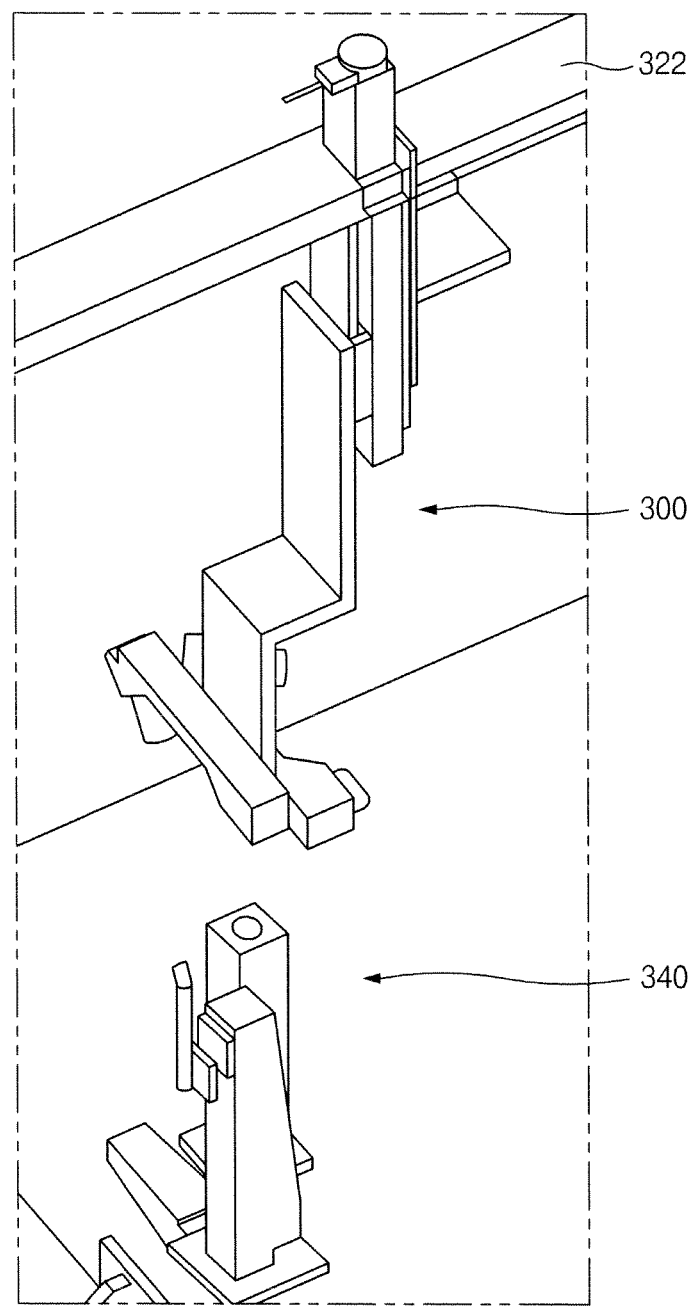
FIG. 16 is a diagram illustrating a state in which the sensor module measures a calibration block according to the method for operating the integrated jig for assembling inspection of FIG. 7.

As illustrated in FIG. 16, the method for operating the integrated jig for assembling inspection of the door assembly 110 according to the exemplary embodiment of the present inventive concept further includes measuring the calibration block 340 provided at one side of the loading module 100 by the sensor module 300 to confirm a measurement origin point, thereby minimizing the measurement error occurring due to the external temperature change.

As set forth above, according to the integrated jig for assembling inspection of the door assembly and the method for operating the same in accordance with the exemplary embodiments of the present inventive concept, it is possible to minimize the measurement error at the time of inspecting the assembling error of the door assembly by fixing the door assembly to the loading module and the alignment module while the door assembly is aligned in the loading module and secondarily aligned in the alignment module.

Further, it is possible to reduce a total volume of apparatus for inspecting the assembling quality of the door assembly by applying the loading module, the alignment module, and the sensor module overlappingly disposed with one another.

In addition, it is possible to reduce the number of process lines by reducing the total volume of apparatus for inspecting the assembling quality of the door assembly.

Furthermore, it is possible to increase the quality of the door assembly by minimizing the measurement error.

Hereinabove, although the present inventive concept has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An integrated jig for assembling inspection of a door assembly, comprising:
    a loading module on which the door assembly is held;
    an alignment module aligning a position of the door assembly to be a reference position and fix the door assembly to the loading module; and
    a sensor module inspecting an assembling state of the door assembly.

2. The integrated jig according to claim 1, further comprising:
    a cooling module cooling the loading module, the alignment module, and the sensor module.

3. The integrated jig according to claim 2, wherein the cooling module includes:
    a space forming container in which the loading module, the alignment module, and the sensor module are accommodated and having a hexahedron shape with one opened surface;
    an air conditioner mounted inside the space forming container; and
    a door selectively opening and closing the opened one surface of the space forming container.

4. The integrated jig according to claim 3, wherein the door is a rapid roll door (PRD) being closed from an upper portion of the space forming container toward a lower portion thereof and being opened from the lower portion of the space forming container toward the upper portion thereof.

5. The integrated jig according to claim 1, wherein the loading module includes:
    a plurality of loading beams disposed on a ground;
    a vacuum cup disposed at an upper end of at least any one of the loading beams and adsorbing onto the door assembly; and
    a guide bar disposed at the upper end of at least any one of the loading beams, contacting a side of the door assembly, and preventing the door assembly from moving in a width direction or a length direction of the door assembly.

6. The integrated jig according to claim 5, wherein the loading beams further include a moving apparatus moving the loading beams on the ground.

7. The integrated jig according to claim 6, wherein the moving apparatus includes:
    a body part attached to the ground;
    a moving part embedded in the body part and connected to a lower end of the loading beams; and
    an actuator configured to move the moving part.

8. The integrated jig according to claim 5, wherein the vacuum cup includes:
   a vacuum cup pad contacting the door assembly and forming a vacuum space;
   a linear rod inserted into the loading beams and having the vacuum cup pad fixed thereto;
   a vacuum cup spring wound around the linear rod and provided under the vacuum cup pad; and
   a linear brake receiving an elastic force from the vacuum cup spring and mounted in the loading beams to fix the linear rod.

9. The integrated jig according to claim 1, wherein the alignment module includes:
   a plurality of alignment beams disposed on a ground;
   a vertical moving apparatus provided at the alignment beam to move along a length direction of the alignment beam;
   a horizontal moving apparatus be interposed between the alignment beam and the ground, and horizontally moving the alignment beam; and
   a control pin provided at the vertical moving apparatus.

10. The integrated jig according to claim 9, wherein the vertical moving apparatus includes a load cell configured to measure a force generated while the vertical moving apparatus moves.

11. The integrated jig according to claim 9, wherein the horizontal moving apparatus includes:
   a first body part fixed on the ground;
   a first moving part embedded in the first body part and moving along a length direction of the first body part; and
   a first actuator configured to move the first moving part.

12. The integrated jig according to claim 11, wherein the horizontal moving apparatus includes:
   a second body part disposed at an upper end of the first body part such that a central axis in a length direction of the second body part is vertical to a central axis in the length direction of the first body part and restrictively connected to the first moving part;
   a second moving part embedded in the second body part and moving along the length direction of the second body part; and
   a second actuator moving the second moving part.

13. The integrated jig according to claim 9, wherein the control pin includes:
   horizontal bar protruding in a width direction of the alignment beam from the vertical moving apparatus;
   a pin provided on a bottom surface of the horizontal bar and vertically protruding toward the ground; and
   a laser displacement sensor provided at the horizontal bar and horizontal to the pin.

14. The integrated jig according to claim 1, wherein the sensor module includes:
   a frame in which the loading module and the alignment module are accommodated;
   a plurality of rails provided in the frame; and
   a sensor body vertically and horizontally moving along the rails.

15. The integrated jig according to claim 14, wherein the frame includes:
   a plurality of pillars disposed on a ground at which the loading module and the alignment module are positioned; and
   a plurality of horizontal beams connecting at least two of the pillars to each other.

16. The integrated jig according to claim 15, wherein the rail includes:
   a plurality of horizontal rails each of which provided at the horizontal beam of the frame; and
   a moving rail connected to different horizontal rails and having both ends moving along the horizontal rails.

17. The integrated jig according to claim 14, wherein the sensor body includes:
   a laser generating optical device generating a line laser toward a coupling portion of the door assembly; and
   a camera photographing an image of the line laser focused on the coupling portion.

18. The integrated jig according to claim 1, wherein the sensor module further includes:
   a calibration block provided at one side of the loading module and the alignment module.

19. The integrated jig according to claim 18, wherein the calibration block includes:
   a block pillar disposed on a ground;
   a reference hole vertically formed at an upper end of the block pillar; and
   a cooling water flowing channel formed inside the block pillar to maintain the block pillar at a reference temperature.

20. A method for operating an integrated jig for assembling inspection of a door assembly, the method comprising steps of:
   holding the door assembly on a loading module;
   fixing, by an alignment module, the door assembly on the loading module; and
   inspecting, by a sensor module disposed over the loading module, an assembling state of the door assembly.

21. The method according to claim 20, wherein the step of holding the door assembly on the loading module includes steps of:
   detaching, by a robot, the door assembly from a moving jig;
   holding the door assembly on the loading module; and
   operating a moving apparatus provided in the loading module and aligning the door assembly.

22. The method according to claim 20, wherein the step of fixing the door assembly to the loading module includes steps of:
   operating a horizontal moving apparatus provided in the alignment module arranged on a vertical line to align a control pin provided in the alignment module and a hole formed in the door assembly; and
   operating a vertical moving apparatus provided in the alignment module to fix the control pin into the hole and aligning the door assembly.

23. The method according to claim 22, wherein the step of operating the vertical moving apparatus continues until the door assembly reaches a preset height, and
   when the door assembly reaches the preset height, a brake provided in the loading module is operated.

24. The method according to claim 23, wherein in the step of operating the vertical moving apparatus, when a value measured by a laser displacement sensor provided in the alignment module is different from a preset value, it is determined that the door assembly is not aligned.

25. The method according to claim 23, wherein in the step of operating the vertical moving apparatus, when a measurement value of a load cell provided in the vertical moving apparatus is increased, it is determined that matching between the control pin with the hole is poor.

26. The method according to claim 20, wherein the step of inspecting the assembling state of the door assembly by the sensor module includes steps of:

moving the sensor module along a rail provided in a frame in which the loading module and the alignment module are accommodated;

operating a laser generating optical device provided in the sensor module to irradiate a line laser to the door assembly; and photographing, by a camera provided in the sensor module, an image of the line laser focused on the door assembly.

27. The method according to claim 20, further comprising a step of:

measuring, by the sensor module, a calibration block provided at one side of the loading module to confirm a measurement origin point.

* * * * *